Figure 1:
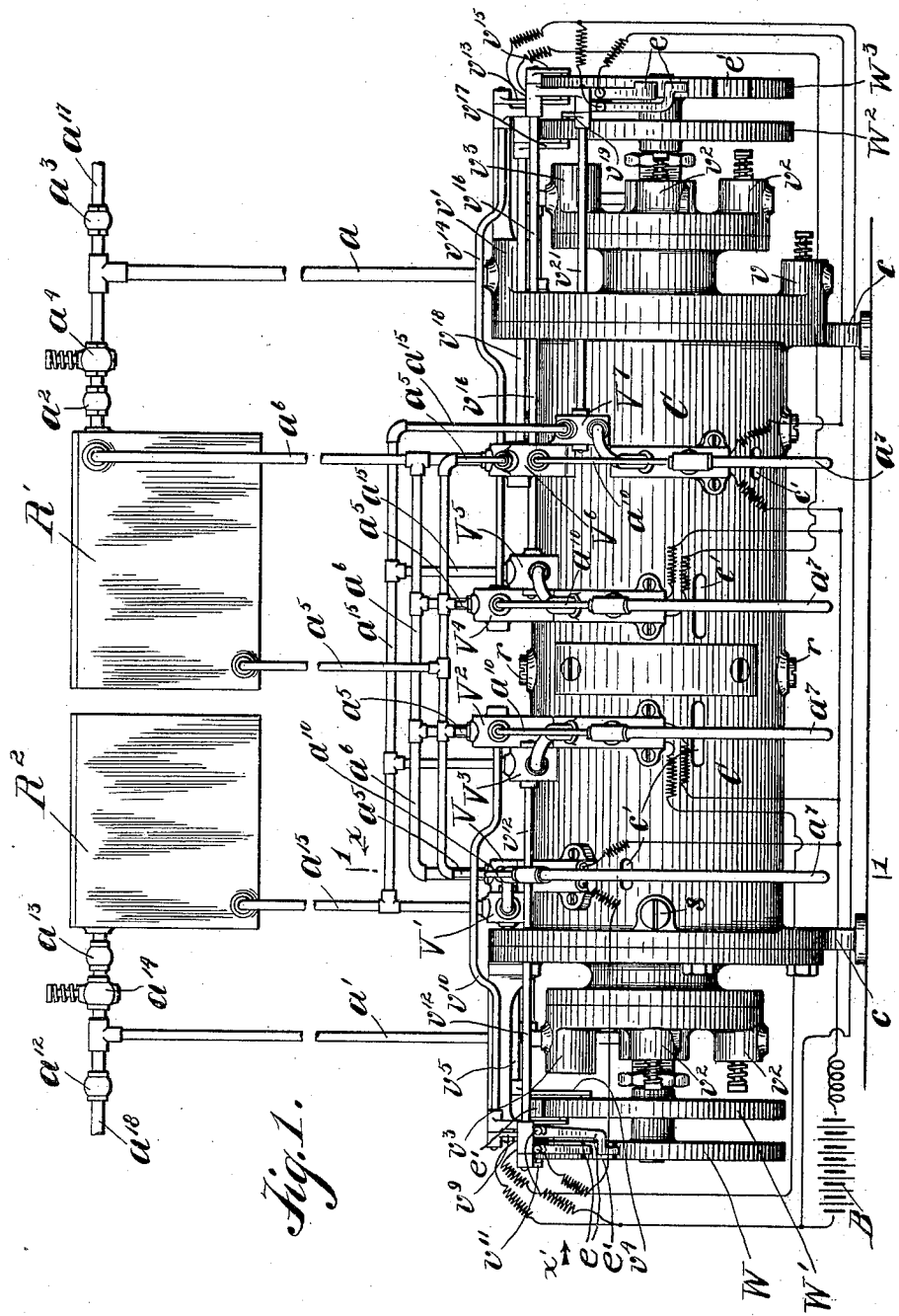

No. 686,809. Patented Nov. 19, 1901.
F. W. JAEGER.
COMBINED STEAM AND GAS ENGINE.
(Application filed June 28, 1900.)

(No Model.) 5 Sheets—Sheet 1.

WITNESSES:
B. McComb.
R. A. Williams.

INVENTOR
Frederick W. Jaeger
BY
ATTORNEY

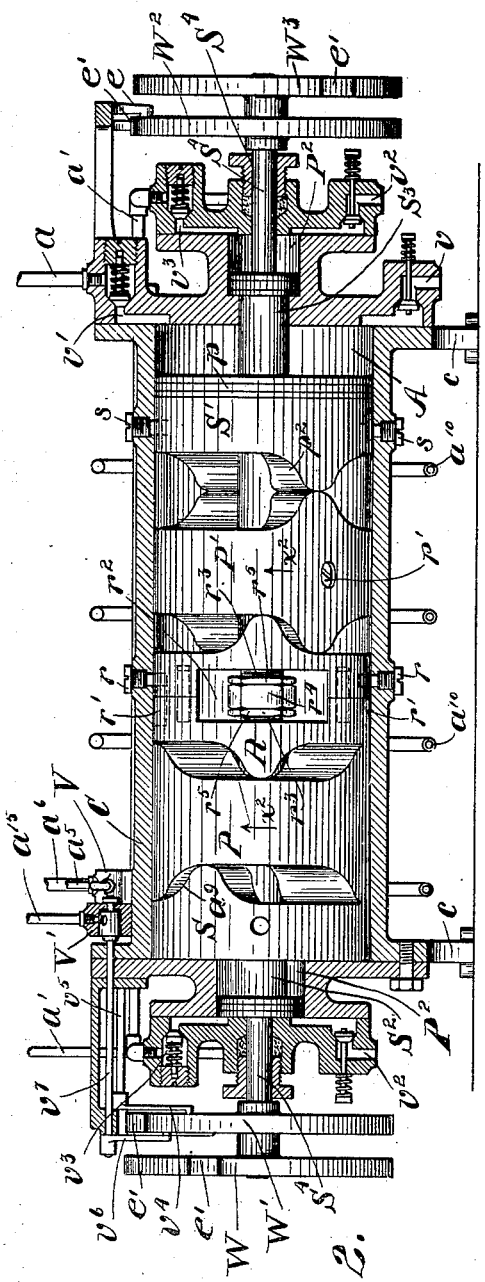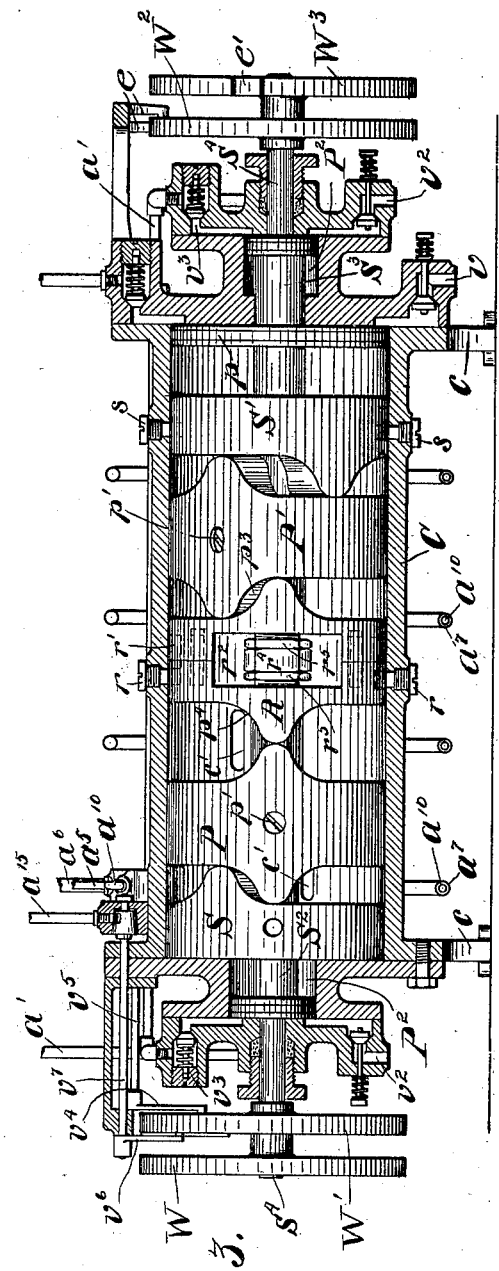

No. 686,809. Patented Nov. 19, 1901.
F. W. JAEGER.
COMBINED STEAM AND GAS ENGINE.
(Application filed June 28, 1900.)
(No Model.) 5 Sheets—Sheet 3.
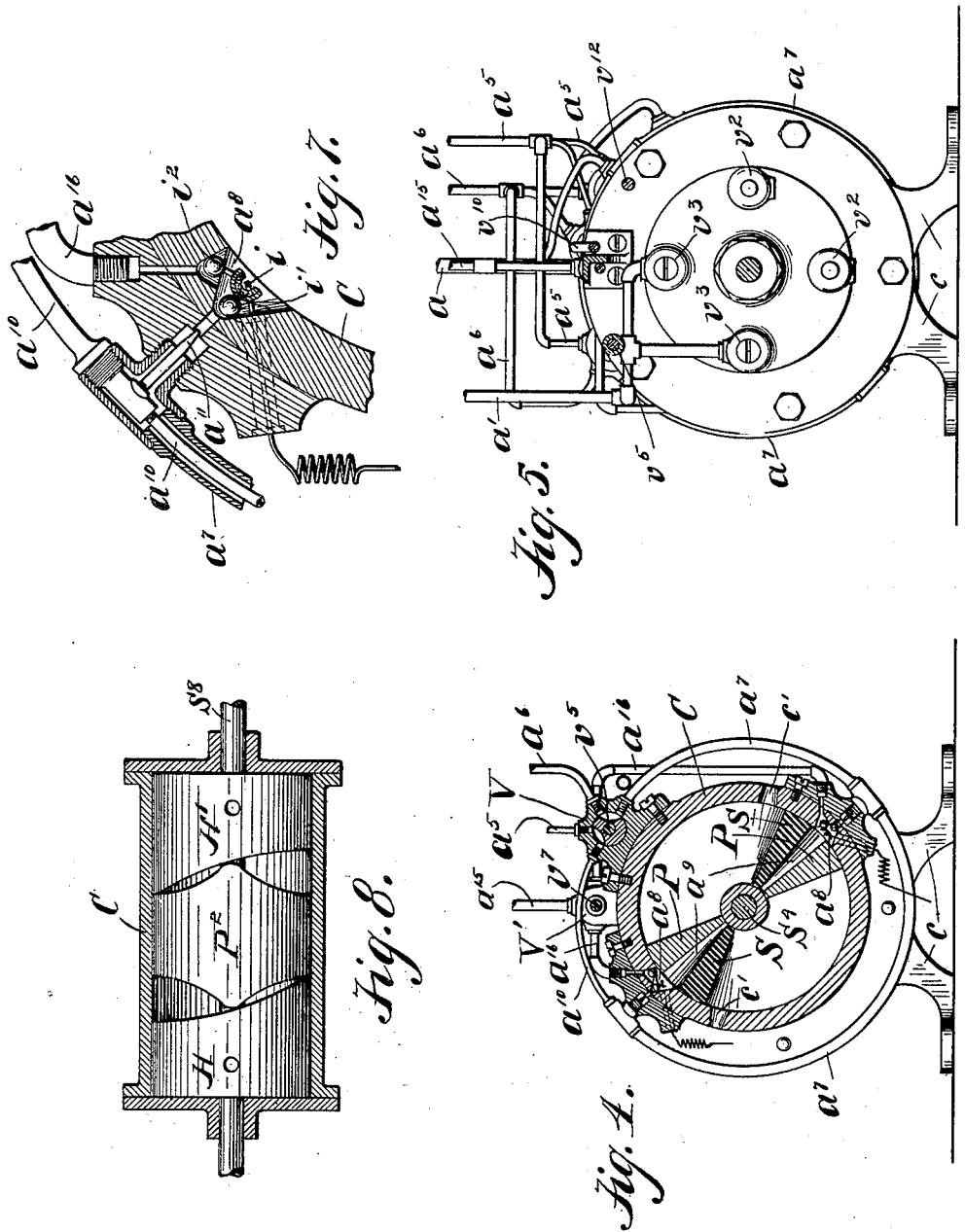
WITNESSES:
INVENTOR
Frederick W. Jaeger.
BY
ATTORNEY No. 686,809. Patented Nov. 19, 1901.
F. W. JAEGER.
COMBINED STEAM AND GAS ENGINE.
(Application filed June 28, 1900.)
(No Model.) 5 Sheets—Sheet 4.
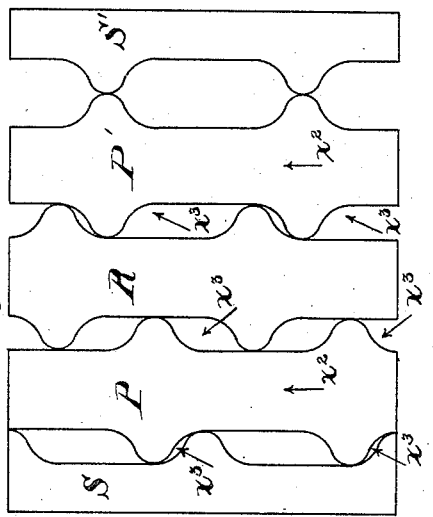
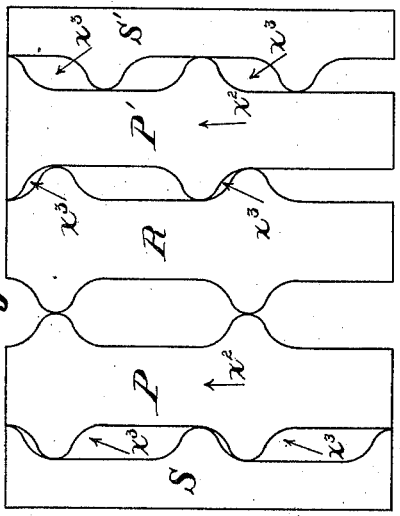
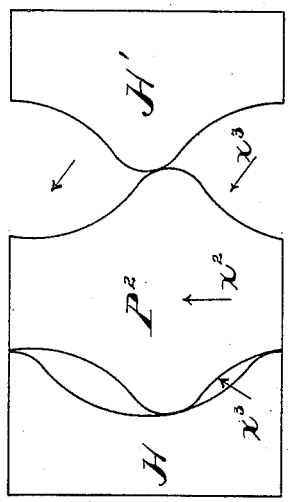
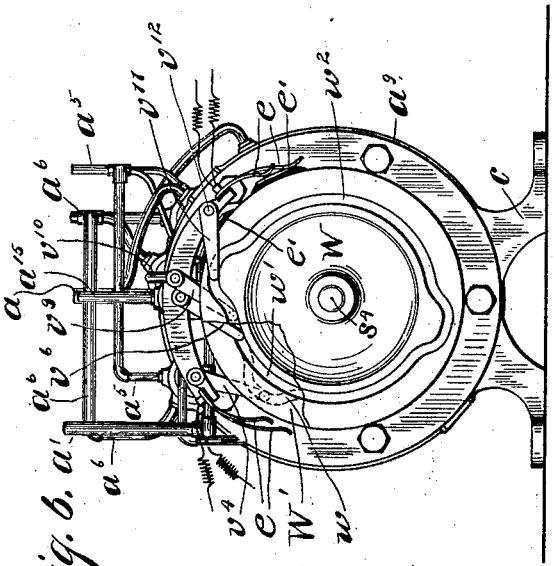
WITNESSES:
INVENTOR
Frederick W. Jaeger.
BY
ATTORNEY No. 686,809. Patented Nov. 19, 1901.
F. W. JAEGER.
COMBINED STEAM AND GAS ENGINE.
(Application filed June 28, 1900.)
(No Model.) 5 Sheets—Sheet 5.

WITNESSES:
INVENTOR
Frederick W. Jaeger
BY
ATTORNEY

UNITED STATES PATENT OFFICE.

FREDERICK W. JAEGER, OF NEW YORK, N. Y.

COMBINED STEAM AND GAS ENGINE.

SPECIFICATION forming part of Letters Patent No. 686,809, dated November 19, 1901.

Application filed June 28, 1900. Serial No. 21,880. (No model.)

*To all whom it may concern:*

Be it known that I, FREDERICK W. JAEGER, a citizen of the United States, and a resident of New York city, county of New York, and State of New York, have invented certain new and useful Improvements in a Combined Gas and Steam Engine, of which the following is a specification, reference being had to the accompanying drawings, forming a part thereof, in which similar letters of reference indicate corresponding parts.

My invention relates to a class of engines wherein I provide rotary reciprocating pistons having projecting-nose abutting surfaces and reciprocating or stationary heads having similar projecting-nose abutting surfaces adapted to engage against and ride over each other to form pockets or chambers for the admission of explosive or expansive fluids, or both, and pump attachments having their pistons attached to and operated by the said rotary reciprocating pistons or reciprocating heads, all incased within an outer cylindrical shell or casing.

This invention is an adaptation of the principles set forth in my previous applications, as follows: Serial No. 658,945, filed November 18, 1897, and allowed March 22, 1900; Serial No. 741,537, filed December 26, 1899, and Serial No. 2,270, filed January 22, 1900, and is in the nature of improvements upon these previous applications.

In my invention I provide an engine of the character described wherein I form pockets or chambers adapted to receive fluid during part of the revolution of the rotary reciprocating pistons with suitable means for igniting the fluid (if explosive fluid be used) and to receive a second fluid during another part of the revolution of the rotary reciprocating pistons immediately after the initial explosion of the first fluid in the chambers. The heat generated in the chambers by the explosion of the first fluid is adapted to expand the second fluid and materially assist the revolution of the rotary reciprocating pistons, while the expansion of the second fluid also acts to cool the parts.

An essential feature of my invention is to provide an engine of the character specified having the rotary reciprocating pistons and the reciprocating or stationary heads so arranged as to admit of a plurality of explosions in the pockets formed, each set of adjacent abutting surfaces being adapted to have one or more explosions and having suitable valves and cam attachments to govern and regulate the supply of the initial and secondary fluids in the pockets or chambers formed and means for igniting the explosive fluid when such is used at the proper time, as will be hereinafter fully described.

A further object of my invention is to provide an engine of the character specified having pumps whose pistons are connected directly to and operated by the rotary reciprocating pistons or reciprocating heads and adapted to keep the fluids in the reservoirs under pressure, as well as to provide an engine of the type specified supplied with suitable means for taking up the wear on the projecting-nosed abutting surfaces and suitable means for locking and coupling the two shafts of the engine to allow for the reciprocation of the rotary piston, as will be hereinafter fully described. In this type of engine the rotary reciprocating pistons and the adjacent reciprocating or stationary heads are adapted to form pockets or chambers for the admission of fluid on both sides of the said rotary reciprocating piston or pistons, so as to cause a suspension or balancing of the said piston or pistons by means of the explosive or expansive element of the fluid introduced in the said pockets or chambers. This class of engine is particularly adapted to the use of various fluids, including compressed air, and is provided with means for injecting hot water or steam in the pockets formed to further increase the expansion of the fluid.

My invention will be best understood when described in connection with the accompanying drawings, in which similar letters refer to similar parts, and in which—

Figure 9:
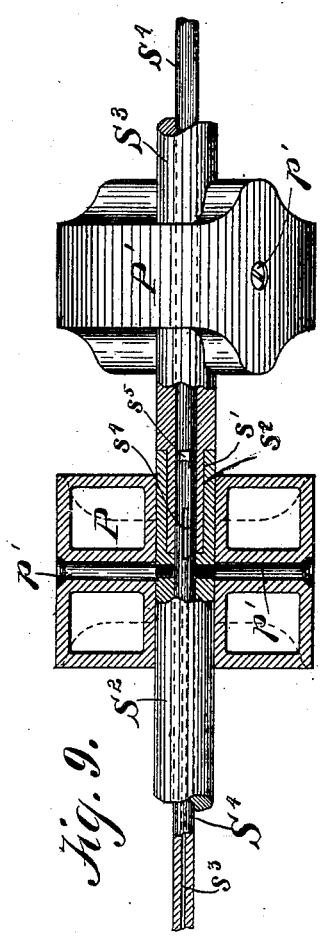
Figure 10:
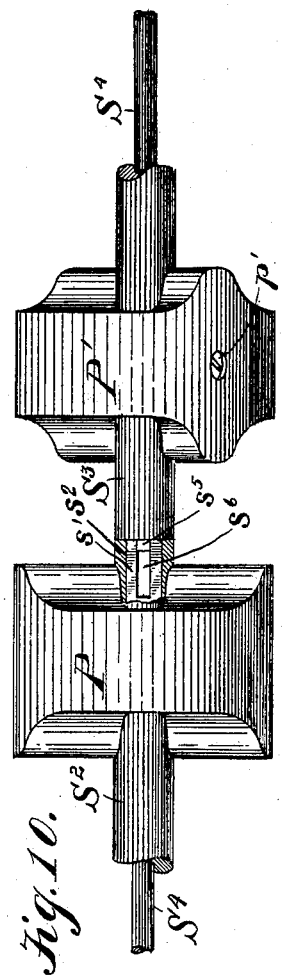
Figure 11:
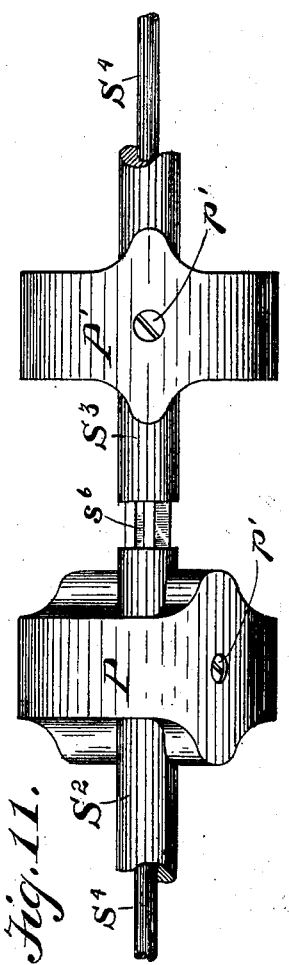

Figure 1 is an exterior elevation of a complete engine embodying my principle. Fig. 2 is a longitudinal section through the casing and shows the interior arrangement of the pistons and heads. Fig. 3 is a similar view showing another position of the pistons and reciprocating head. Fig. 4 is a cross-section on the line 1 1 of Fig. 1 looking in the direction of the arrow X. Fig. 5 is an end view having the outer cam-wheels removed and shows a view looking in the direction of the arrow X' of Fig. 1. Fig. 6 is a similar end view which shows the cam-wheels in place. Fig. 7 is an enlarged detail view of the injector, showing method of injecting fluid into the chambers or pockets formed by the projecting-nosed abutting surfaces of the pistons and heads. Fig. 8 is a view showing a single piston rotating between two stationary heads. Fig. 9 is a detail view, partly in section, and shows a means of coupling the two inner ends of the shaft. Fig. 10 is a view showing the position of the ends with the piston-rod in position shown in Fig. 2. Fig. 11 is a view showing the position of the ends when the pistons are in position shown in Fig. 3. Fig. 12 is a diagram showing the developed lines of the projecting-nosed abutting surfaces of the piston and heads shown in Fig. 8. Fig. 13 is a diagram showing the developed lines of the piston and head when in the position shown in Fig. 2, and Fig. 14 is a similar diagram showing the lines of the projecting-nosed abutting surfaces when the pistons and head are in the position shown in Fig. 3.

Referring to the drawings, C designates the outer shell or casing, formed with the legs $c$. S and S' designate stationary heads securely fastened within the said casing.

R designates the reciprocating head, mounted and held within the casing by means of the pins $r$, engaging in the grooves $r'$, so as to prevent the rotation of the said reciprocating head and at the same time to allow said head to reciprocate.

P and P' designate the rotary reciprocating pistons, mounted upon the shafts $S^2$ and $S^3$, and are formed with projecting noses upon both sides, which are adapted to abut and engage against the similar nose formations upon the adjacent stationary and reciprocating heads.

A is an air chamber or pump formed upon the end of the casing C and has a piston $p$, mounted upon the shaft $S^3$, reciprocating within it and draws the air into the chamber through the valve $v$ and forces it out through the valve $v'$ through the pipe $a$ to the reservoir R'.

$P^2$ designates small pumps operated by pistons securely fastened to the shafts $S^2$ and $S^3$ and are each provided with an inlet and an outlet valve $v^2$ and $v^3$, respectively, and are adapted to force air through the pipe $a'$ to the reservoir $R^2$.

To afford a means for taking up the wear on the abutting surfaces, I split the reciprocating head R and form it of two sections, forming the central opening $r^2$. Upon each of the sections in this opening $r^2$ I form the threaded flanges $r^3$, upon which engages the connecting-nut $r^4$. This nut is adapted to force apart the two sections, thereby assuring perfect contact of the abutting noses and surfaces. To securely lock the connecting-nut $r^4$, I provide the locking-nuts $r^5$.

The rotary reciprocating pistons and reciprocating and stationary heads are preferably made of a hollow shell, as shown in Fig. 9. The reciprocating head R is held within the casing in a manner hereinbefore described, while the stationary heads are held within the casing by means of the pins $s$, and the pistons are secured upon the shafts $S^2$ and $S^3$ by means of the pins $p'$.

$S^4$ designates a shaft extending concentrically through the pistons and heads and has mounted upon each end two cam-wheels W, W', $W^2$, and $W^3$.

V designates a rotary valve operated by the arm $v^4$, which is mounted upon the end of a shaft $v^5$, to which the disk in the valve is attached. The end of the arm $v^4$ engages in a groove $w$, formed upon the cam W', and is adapted to open and close the valve V at the proper time to admit explosive fluid into the pockets formed by the abutting noses and surfaces.

V' designates the valve operated by the arm $v^6$, which is mounted upon the shaft $v^7$, which in turn is connected to the rotating plug in the valve V'. The end of the arm $v^6$ engages in a groove $w'$, which is formed upon the cam W' and acts to open and close the valve at the proper time to admit the secondary fluid into the pockets formed between the pistons and heads.

The valves $V^2$, $V^4$, and $V^6$ and valves $V^3$, $V^5$, and $V^7$, which are similar, respectively, to the valves V and V', are located at proper distances upon the casing C. The valve $V^2$ is operated by the arm $v^9$, which is mounted upon the end of the shaft $v^{10}$ and engages in a groove upon the cam W. The valve $V^3$ is operated by means of the arm $v^{11}$, mounted upon the shaft $v^{12}$ and engaging in the groove $w^2$ upon the cam W. The valve $V^4$ is operated by means of the arm $v^{13}$, which is mounted upon the end of the shaft $v^{14}$ and engages in a groove upon the cam $W^3$. The valve $V^5$ is operated by means of the arm $v^{15}$, mounted upon the shaft $v^{16}$ and engaging in a groove on the cam $W^3$. The valve $V^6$ is operated by means of the arm $v^{17}$, mounted upon the end of a shaft $v^{18}$ and engaging in a groove upon the cam $W^2$, and the valve $V^7$ is operated by means of the arm $v^{19}$, mounted upon the shaft $v^{21}$ and engaging in a groove upon the cam $W^2$.

The reservoir R' is adapted to contain an explosive liquid, which is kept under pressure by the action of the pump A, which forces the air up through the pipe $a$ into the receptacle R' or reservoir, as hereinbefore stated. $a^2$ and $a^3$ designate check-valves, and $a^4$ is a pressure-valve adapted to stand a certain pressure under which it is desired to keep the liquid in the reservoir R'. The liquid in the receptacle R' is led off through the pipe $a^5$ to the valves V, $V^2$, $V^4$, and $V^6$, and the air from the upper portion of the reservoir R' is led off through the pipe $a^6$ to the same valves, from whence it is led by means of the pipe $a^7$ to the ports $a^8$, opening into the pockets $a^9$. The liquid is led from the valves through the pipe $a^{10}$ to the ports $a^8$. The pipe $a^{10}$ is partly inclosed in the pipe $a^7$. (See Figs. 4 and 7.) The inlet-pipes for the air and liquid are so arranged that the air enters the port $a^8$ around the injector $a^{11}$, through which the liquid enters the port, thereby causing a commingling of the liquid and the air, thus producing a gaseous substance which is ignited at the proper moment by means of platinum wire $i$, which is heated to a red heat by means of an electric circuit which is controlled by suitable contact-points $e$ and circuit-closers $e'$.

The receptacle $R^2$ is adapted to contain water or other expansible liquid, which is kept under pressure by means of air forced into the reservoir through the pipe $a'$, which connects with the valves $v^3$ on both ends of the engine. $a^{12}$ and $a^{13}$ are check-valves, and $a^{14}$ is a pressure-valve which is adapted to prevent the pressure in the reservoir going above a certain point. The liquid in the reservoir $R^2$, which I have hereinbefore designated as a "secondary fluid," is led off through the pipe $a^{15}$ to the valves $V'$, $V^3$, $V^5$, and $V^7$, from whence it is led by the pipes $a^{16}$ to the ports $a^8$.

The pistons and adjacent reciprocating and stationary heads are so arranged within the casing as to form the pockets, so that two explosions can occur simultaneously between each set of abutting surfaces and so that each set of simultaneous explosions will occur in a successive order. For example, by referring to the drawings, Figs. 2 and 3, the first two explosions occur simultaneously in the pocket $a^9$ and a similar pocket diametrically opposite between the abutting surfaces of the head S and piston P. Immediately after these first explosions two explosions occur simultaneously in the pockets formed between the piston P' and head S', and following directly after these explosions two explosions occur in the pockets formed between the piston P' and reciprocating head R, and finally, following directly upon these last explosions, two simultaneous explosions occur in the pockets between the piston P and reciprocating head R. The explosions are continually repeated in the manner described as long as the engine is in operation.

To supply a means for igniting the fluid, I provide a battery B, having independent circuits connected with each set of valves, and contact points or brushes $e$, interposed in each circuit and adapted to close the circuit at the proper time by means of contact-pieces $e$ on the cam-wheels, arranged to engage the said brushes and act to close the circuit, thereby heating the platinum wire $i$ (see Fig. 7) to a red heat, causing the explosion of the fluids in the chambers. The circuit-closers $e'$ are located at proper points upon the cams W, W', W², and W³ and engage with the contact-points $e$, which form the terminals of the electric circuit leading from the various explosion-chambers. In the operation of the engine the contact-points $e$ engaging with the contact-closers $e'$ complete the electric circuit and bring the platinum wire with which the particular circuit connects to a red heat and ignite the explosive fluid in the chamber. Referring to Fig. 1 in conjunction with Figs. 2 and 3, it will be seen that the contact-points and circuit-closers engaging upon the cam-wheel W act to ignite the fluid in the pockets formed between the hood S and the piston P. Those engaging with the cam W operate to ignite the fluid in the pockets formed between the piston P and the reciprocating head R. The contact-points and circuit-closers engaging with the cam W² operate to ignite the fluid in the pockets formed between the reciprocating hood R and the piston P', and the contact-points and circuit-closers engaging with the cam W³ operate to ignite the fluid in the pockets formed between the piston P' and the head S'. To prevent the explosion from driving back into the inlets from the pipes $a^7$, $a^{10}$, and $a^{16}$, I provide the balls $i'$ and $i^2$, which are adapted to effectively close the inlets by the force of the explosion.

To permit the reciprocating motion of the pistons, which are securely fastened to the shafts $S^2$ and $S^3$, through which the shaft $S^4$ passes, I provide a sliding coupling or connection, as shown in Figs. 9, 10, and 11.

$s'$ designates a square shank formed upon the end of the shaft $S^3$ and is adapted to engage in the square opening $s^2$, formed upon the end of the shaft $S^2$. The shank $s'$ may be made about twice as long as the reciprocating motion of the piston, so that it at no time leaves the opening $s^2$ and is adapted to be entirely inclosed by the reciprocating head R. To prevent the formation of an air-cushion in the square portion $s^2$, I provide the shaft $S^4$ with a passage $s^3$, which runs to the outer end of the shaft and terminates in the other direction in the port $s^4$. The shaft $S^4$ is secured to the shaft $S^3$ by means of a pin $s^5$, securely fastened to the shaft $S^4$ and engaging in a slot $s^6$, formed in the shank $s'$.

Fig. 8 shows a simplified form of my device, wherein I use but one piston $P^2$, which rotates and reciprocates between two stationary heads H and H'. The piston $P^2$ is mounted upon the shaft $S^3$, which reciprocates with the piston.

Fig. 12 is a diagram of the developed lines of the form shown in Fig. 8. The arrow $X^2$ indicates the rotation of the piston $P^2$, and the arrows $x^3$ show the direction of the pressure exerted by the fluids in the chambers. In Figs. 13 and 14 similar arrows show the rotation of the piston in the direction of the force exerted by the different fluids in the pockets.

In the operation of my device, as illustrated in the accompanying drawings, the explosive fluid is admitted into the pocket $a^9$ and ignited and exploded, causing the pistons P to be driven in the direction indicated by the arrows $x^2$ until the piston P' forms a pocket at $p^2$, when an explosion similar to that which occurred in the pocket $a^9$ takes place, moving the pistons still farther in their rotation until the piston P' forms a pocket at $p^3$, as shown in Fig. 3. An explosion now takes place in this pocket, and the pistons continuing to rotate another pocket is formed at $p^4$, which receives fluid for explosion, and continuing farther the pistons again assume the position shown in Fig. 2, forming the pockets $a^9$. The exhaust fluids are allowed to pass out through the ports $c'$. A considerable amount of heat is generated by the explosions in the various pockets or chambers. I take advantage of this heat to expand a secondary fluid, which I admit into the pockets immediately after the initial explosion, and thereby materially aid the rotation of the pistons. The expansion of the secondary fluid in the pockets acts to cool the parts.

To insure the proper working of the engine at the start, it is necessary that the fluids contained in the reservoirs R' and R² be under pressure. For this purpose an ordinary hand-pump may be attached to the pipes $a^{17}$ and $a^{18}$, which form branches of the pipes $a$ and $a'$, respectively, and air forced into the reservoirs until the required pressure is reached. The reservoirs may be located at any convenient distance from the engines and properly connected to same by the pipes hereinbefore specified.

In the drawings I have shown the pistons and heads having two nosed projections upon their abutting surfaces; but it is obvious that I may construct my device having pistons and heads provided with but one nosed projection, in which case I will have the same number of controlling-valves, but need have only one port for the admission of the fluid, and can dispense with the duplication of the ports for the different sets of pockets, as shown in the drawings, or a similar engine may be constructed having pistons and heads provided with a plurality of noses adapted to form a plurality of pockets between the abutting surfaces, in which case a port will have to be provided for each pocket formation of the different sets of pockets, but they may all be connected and controlled by the valve arrangement shown in the drawings.

It is obvious that my engine may be used as a compressed-air engine, into which I introduce hot water or steam as a secondary fluid to further increase the expansion of the compressed air. It is not absolutely necessary, however, for the perfect working of the engine for me to use the secondary fluid, as any fluid having an expansive element introduced in the chambers will tend to rotate the pistons.

This form of engine may be adapted to be used in conjunction with various forms of carbureters or condensers.

Having thus described my invention, what I claim as new, and desire to secure by Letters Patent, is—

1. In an engine as herein described, the combination with a cylindrical casing, of rotary reciprocating pistons, stationary heads secured within said casing concentrically with and adjacent to the said pistons and a reciprocating head formed in two sections and also located within the said casing concentrically with and adjacent to the said pistons, all provided with cam-shaped adjacent surfaces having abutting noses adapted to ride over each other and form pockets upon each side of the rotary pistons, a shaft passing concentrically through the said pistons and heads, pins securely fastened to one section of the aforesaid reciprocating head and adapted to engage in corresponding openings in the other section of the said reciprocating head, threaded flanges formed upon both sections of said reciprocating head adapted to engage around the said shaft of engine, and locking-nuts operating upon the said threaded flanges to separate or force apart the two sections of the said reciprocating head, thereby taking up the wear on the abutting cam-shaped surfaces and noses, substantially as described.

2. In an engine as herein described, the combination with a cylindrical casing, of a shaft centrally mounted within the said cylindrical casing, a rotary piston or pistons mounted concentrically within the said casing and having their adjacent faces abutting upon the said shaft, and a sliding coupling formed upon the ends of the two sections of the shaft and adapted to engage with each other to keep the aforesaid rotary reciprocating pistons relatively in position, substantially as described.

3. In an engine as herein described, the combination with a cylindrical casing, of rotary reciprocating piston or pistons and adjacent reciprocating heads secured within said casing concentrically with and adjacent to the said pistons and formed with abutting surfaces and projecting noses adapted to contact and engage against each other to form pockets for the admission of fluids whose impact tends to rotate the said reciprocating piston or pistons, and exhaust-pockets formed by said abutting surfaces and projecting noses, reservoirs for containing liquids for producing the expansive fluid, pump attachments operated by the said rotary reciprocating piston and employed as a means for keeping the liquids in the said reservoirs under a pressure, valves for regulating and controlling the admission of the said fluids into the said pockets, suitable connections for connecting the said reservoirs and the said valves in proper series, a cam attachment on the shaft of the engine adapted to operate the said valves, and suitable means for igniting the fluid in the pockets, substantially as described.

4. In an engine as herein described, the combination with a cylindrical casing, of a rotary reciprocating piston or pistons and adjacent stationary heads secured within said casing concentrically with and adjacent to the said pistons and formed with abutting surfaces and projecting noses adapted to contact and engage against each other and form pockets for the admission of fluids whose impact tends to rotate the said reciprocating piston or pistons, exhaust-pockets formed by the said abutting surfaces and projecting noses, reservoirs for containing liquids for producing the expansive fluid, pump attachments operated by the said rotary reciprocating piston and heads and employed as a means for keeping the liquids in said reservoirs under a pressure, valves for regulating and controlling the admission of the said fluids into the said pockets, suitable connections for connecting the said reservoirs and the said valves in proper series, a cam attachment upon the shaft of the engine adapted to operate the said valves and suitable means for igniting the fluid in the pockets, substantially as described.

5. In an engine as herein described, the combination with a cylindrical casing, of rotary reciprocating pistons and reciprocating heads secured within the said casing concentrically with and adjacent to the said pistons and provided with cam-shaped abutting surfaces having contacting noses adapted to ride over each other and form a plurality of pockets, one series of which is adapted to receive expansible fluids during part of the revolution of the rotary reciprocating pistons and a secondary fluid during another part of the revolution of the said rotary reciprocating pistons, immediately after the initial explosion while the other series of pockets act as exhaust-chambers, adjacent abutting noses being so arranged as to form pockets for two simultaneous explosions occurring consecutively between each set of abutting noses, suitable connections and valves for conducting the fluid and governing the admission of the initial and secondary fluids, and means for igniting the initial fluids, substantially as described.

6. In an engine as herein described, the combination with a cylindrical casing, of rotary reciprocating pistons, stationary heads secured within said casing concentrically with and adjacent to the said pistons and provided with cam-shaped abutting surfaces having contacting noses adapted to ride over each other and form a plurality of pockets, one series of which is adapted to receive expansible fluids, during part of the revolution of the rotary reciprocating pistons, and a secondary fluid during another part of the revolution of the said rotary reciprocating pistons, immediately after the initial explosion while the other series of pockets act as exhaust-chambers; the adjacent abutting noses being so arranged as to form pockets for two simultaneous explosions occurring consecutively between each set of abutting noses, suitable connections and valves for conducting the fluids and governing the admission of the initial fluid and secondary fluid, and means for igniting the initial fluid, substantially as described.

7. In an engine as herein described, the combination with a cylindrical casing, of rotary reciprocating pistons and reciprocating and stationary heads secured within said casing concentrically with and adjacent to the said pistons and provided with cam-shaped abutting surfaces having single contacting noses adapted to ride over each other and form pockets upon each side of the said rotary pistons; one series of pockets being adapted to receive expansible fluid during part of the revolution of said rotary reciprocating pistons and a secondary fluid, during another part of the revolution of the said rotary reciprocating pistons, immediately after the initial explosion while the other series of pockets act as exhaust-chambers, suitable connections and valves for conducting the fluids and governing and controlling the admission of the same, and means for igniting the explosive fluid when the same is used, substantially as described.

8. In an engine as herein described consisting of a casing, a rotary reciprocating piston and reciprocating head secured within said casing concentrically with and adjacent to the said rotary reciprocating piston and provided with cam-shaped abutting surfaces having noses adapted to engage against the adjacent sides of the said rotary reciprocating piston and reciprocating head and form pockets for the admission of expansible fluid whose impact, when exploded, tends to rotate the said reciprocating piston, exhaust-pockets formed between the contacting sides of the said piston and head, reservoirs adapted to contain the explosive fluids, means for igniting the said explosive fluids in combination with cylindrical pumps formed upon the end of said casing, piston-heads engaging within said cylindrical pumps and suitably connected to the said rotary reciprocating piston, operated by the reciprocation of the said piston and adapted to keep the fluids in the reservoirs under pressure, and suitable connections for conducting the fluids from the reservoir to the pockets, substantially as described.

9. In an engine as herein described consisting of a casing, a rotary reciprocating piston and stationary head secured within said casing concentrically with and adjacent to the said rotary reciprocating piston and provided with cam-shaped abutting surfaces having noses adapted to engage against the adjacent sides of the said rotary reciprocating piston and stationary head and form pockets for the admission of explosive fluid whose impact, when exploded, tends to rotate the said reciprocating piston, exhaust-pockets formed between the contacting sides of the said piston and head, reservoirs adapted to contain the explosive fluids, and means for igniting the said explosive fluids in combination with cylindrical pumps formed upon the end of said casing, piston-heads engaging within said cylindrical pumps and suitably connected to the said rotary reciprocating piston operated by the reciprocation of the said piston and adapted to keep the fluids in the reservoirs under pressure, and suitable connections for conducting the fluids from the reservoir to the pockets, substantially as described.

10. In an engine as herein described consisting of a casing, a rotary reciprocating piston and reciprocating head secured within said casing concentrically with and adjacent to the said rotary reciprocating piston and provided with cam-shaped abutting surfaces having noses adapted to engage against the adjacent sides of the said rotary reciprocating piston and reciprocating head and form pockets for the admission of explosive fluids whose impact, when exploded, tends to rotate the said reciprocating piston, exhaust-pockets formed between the contacting sides of the said piston and head, reservoirs adapted to contain the explosive fluids, and means for igniting the said explosive fluids in combination with cylindrical pumps formed upon the end of said casing, piston-heads engaging within said cylindrical pumps and suitably connected to the said reciprocating head, operated by the reciprocation of the said head and adapted to keep the fluids in the reservoir under pressure, and suitable connections for conducting the fluids from the reservoir to the pockets, substantially as described.

11. In an engine as herein described, the combination with a casing, of a rotary reciprocating piston provided on opposite sides with abutting surfaces and projecting noses, cylinder-heads secured within said casing concentrically with and adjacent to the said piston and provided with similar abutting surfaces and projecting noses adapted to engage with the adjacent abutting surfaces of the said piston, a plurality of pockets formed on each side of the piston, of which one set of pockets on each side is adapted to contain expansive fluid and the other set exhaust fluid, the said piston being thereby balanced between columns of fluid acting in angularly opposite directions to cause its rotation, a shaft centrally located within the casing and adapted to rotate with the piston, pumps formed on the outside of said cylinder-head, piston-heads located within said pumps, hollow shafts engaging around the aforesaid shafts and connecting the said piston-heads with the aforesaid rotary reciprocating piston, and suitable connections for conducting the live fluid from the reservoir to the pockets, substantially as and for the purpose specified.

12. In an engine as herein described, the combination with a casing, rotary reciprocating pistons provided on opposite sides with abutting surfaces and projecting noses, stationary heads secured within said casing concentrically with and adjacent to the said pistons and provided with similar abutting surfaces and projecting noses and adapted to engage with their adjacent abutting surfaces, a plurality of pockets on each side of the pistons of which one set is adapted for expansive fluid and the other set for exhaust fluid, the said pistons being partly balanced between the columns of fluid whose expansive element causes the rotation of the said rotary reciprocating pistons, a shaft centrally located and adapted to rotate with the pistons, reservoirs adapted to contain the said fluids, pumps formed on the outside of said cylinder-head, piston-heads located within said pumps, a hollow shaft engaging around the aforesaid shaft and connecting the piston-head with the aforesaid rotary reciprocating pistons and reciprocating heads, the action of the said pumps being adapted to keep the fluids in the reservoirs under pressure, suitable connections for conducting the fluids from the reservoir to the pockets and suitable means for governing and controlling the admission of the fluids into the said pockets, substantially as described.

In testimony that I claim the foregoing as my invention I have signed my name, in presence of two witnesses, this 27th day of June, 1900.

FREDERICK W. JAEGER.

Witnesses:
B. McCOMB,
S. S. SUGAR.